United States Patent [19]

Schaefer

[11] 4,222,406

[45] Sep. 16, 1980

[54] WEDGE-TYPE GATE VALVE

[76] Inventor: Louis C. Schaefer, 615 Roosevelt Dr., Oceano, Calif. 93445

[21] Appl. No.: 931,760

[22] Filed: Aug. 7, 1978

[51] Int. Cl.³ .............................. F16K 3/14; F16K 3/36
[52] U.S. Cl. ............................... 137/246.22; 251/175; 251/203; 251/327
[58] Field of Search .............. 137/246, 246.15, 246.16, 137/246.22; 251/193, 175, 203, 157, 158, 167, 196, 326–329

[56] References Cited

U.S. PATENT DOCUMENTS

| 825,064 | 7/1906 | Levey | 251/203 X |
| 1,009,763 | 11/1911 | Marsh | 251/86 |
| 1,780,828 | 11/1930 | Leach et al. | 137/246.15 |
| 2,032,882 | 3/1936 | McCausland et al. | 137/246.16 |
| 2,276,939 | 3/1942 | Davis | 137/246.13 |
| 3,442,286 | 5/1969 | Anderson et al. | 137/246.22 |
| 3,963,214 | 6/1976 | Hackman et al. | 251/326 |

FOREIGN PATENT DOCUMENTS

| 274393 | 7/1927 | United Kingdom | 251/327 |
| 420837 | 6/1971 | U.S.S.R. | 251/327 |

Primary Examiner—Martin P. Schwadron
Assistant Examiner—Richard Gerard
Attorney, Agent, or Firm—Harris, Kern, Wallen & Tinsley

[57] ABSTRACT

A wedge-type gate valve with a one-piece gate or wedge movable longitudinally of itself in the valve chamber and transversely of the flow passage between open and closed positions. The gate is a one-piece structure having longitudinal V-shaped guide grooves in opposite edges thereof into which extend aligned, conical guide pins carried by the valve body. The edges of the wedge are also provided with inclined cam grooves engageable by the guide pins to cam the wedge against one of its seats in the open position of the wedge. The wedge is provided with a lubricant annulus communicating with one or both valve seats in the closed position of the wedge, the lubricant annulus being provided with a suitable lubricant through a threaded actuating stem. The inner end of the actuating stem has a doubly-tapered radially-outwardly-convergent head disposed in a complementary socket in the wedge, with seals between the wedge and such head, on both sides of the head.

7 Claims, 6 Drawing Figures

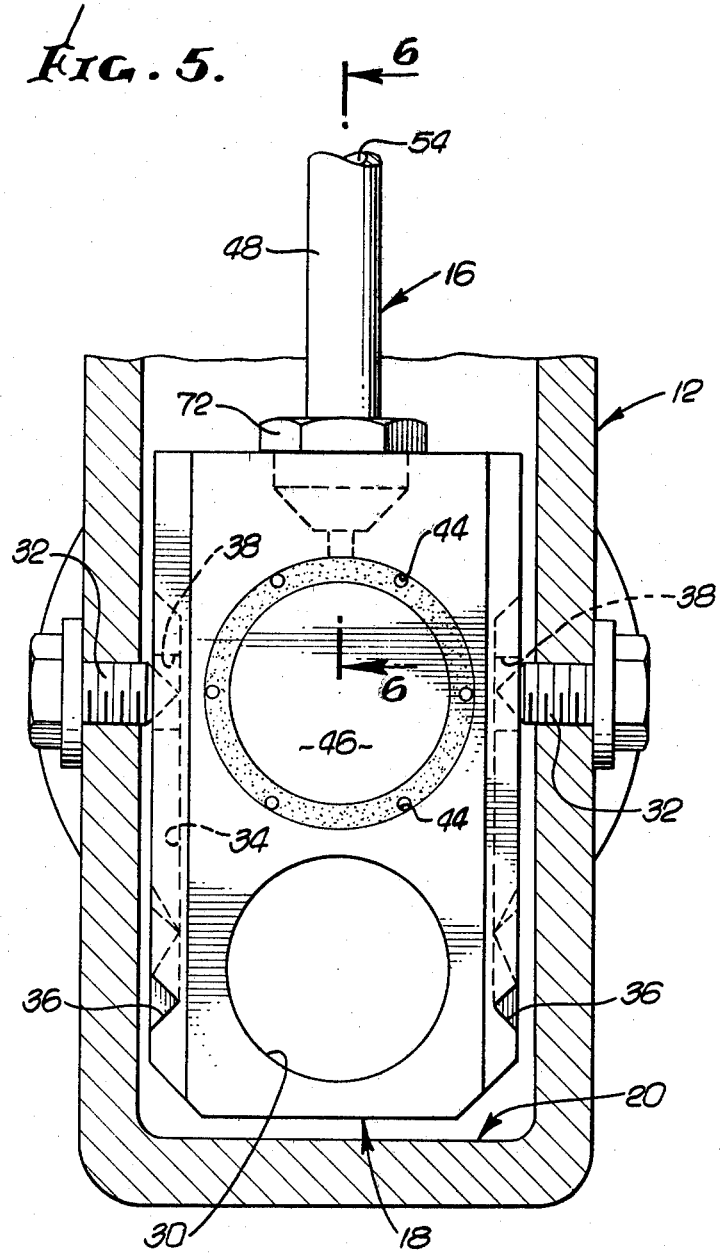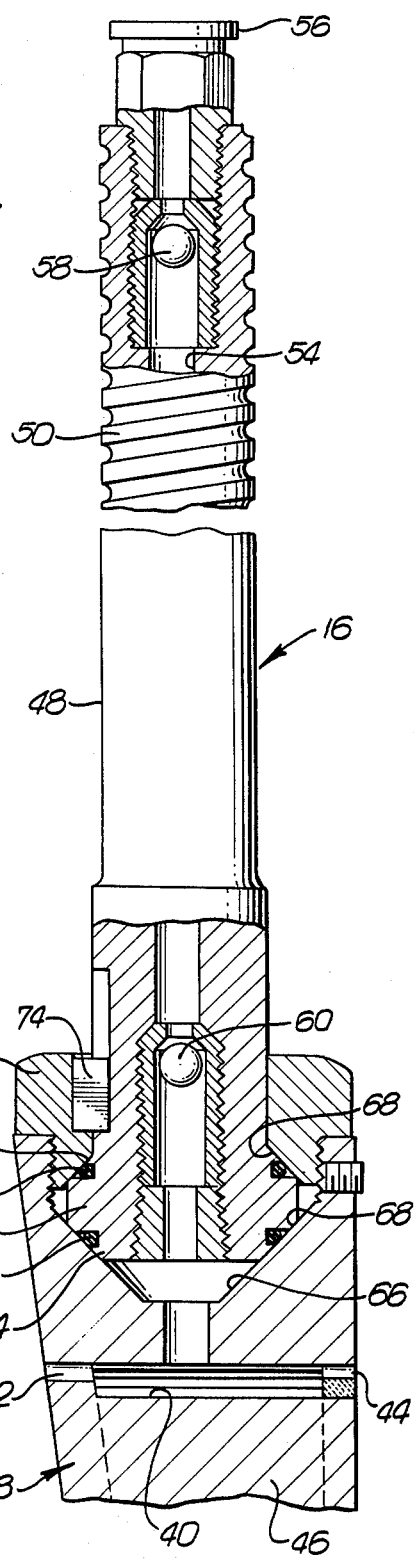

WEDGE-TYPE GATE VALVE

BACKGROUND OF INVENTION

The present invention relates in general to gate valves and, more particularly, to a gate valve of the so-called wedge type, wherein at least a portion of the gate is tapered and a corresponding portion of the valve chamber is complementarily tapered to receive the tapered portion of the gate in the closed position thereof.

More particularly, the invention contemplates a wedge-type gate valve which includes: a valve body provided therein with a valve chamber having at least a tapered portion and provided therethrough with a flow passage intersecting the tapered portion of the valve chamber; a wedge-type gate movable longitudinally of itself in the valve chamber and transversely of the flow passage between open and closed positions, the gate having a tapered portion complementary to the tapered portion of the valve chamber, and having an opening therethrough which registers with the flow passage in the open position of the gate, such opening preferably being a circular port; the valve body being provided with annular seats for the gate which encircle the flow passage on opposite sides of the tapered portion of the valve chamber; guide means carried by the valve body and engageable with the gate for guiding the gate between its open and closed positions; and actuating means carried by the valve body and connected to the gate for moving the gate between its open and closed positions.

OBJECTS AND SUMMARIES OF INVENTION

A general object of the invention is to provide a wedge-type gate valve of the foregoing general nature which incorporates various improvements rendering it more effective for its intended purpose.

More particularly, the invention may be summarized as including, and an important object of the invention is to provide a gate valve which includes, a guide means for the gate comprising longitudinal V-shaped guide grooves in opposite edges of the gate, and comprising aligned, conical guide pins carried by the valve body and respectively extending into the guide grooves. Guiding of the gate during movement between its open and closed positions is carried out entirely by the guide grooves and the complementary guide pins, it being unnecessary to have guiding contact between the gate and the walls of the valve chamber.

Another important object is to provide a gate valve of the foregoing nature wherein the guide grooves are provided opposite the flow opening through the gate with inclined cam grooves into which the guide pins extend in the open position of the gate to cam the gate against one of its seats in the open position of the gate, thereby eliminating possible abrasion of such seat and the corresponding side of the gate due to the presence of abrasives in the fluid flowing through the valve.

Still another important object is to provide guide grooves which are widened slightly opposite that portion of the gate which is aligned with the seats in the closed position of the gate. This provides slight clearances between the guide pins and the sides of the guide grooves in the closed position of the gate so that the gate is free to be seated properly in its closed position by line pressure in the flow passage.

The invention may be still further summarized as comprising, and an additional important object of the invention is to provide a gate valve which comprises, a gate having a solid core which is aligned with the annular seats in the closed position of the gate, such solid core being surrounded by a lubricant annulus within the gate which discharges through lubricant ports on at least one side of the gate, and the actuating means being provided with lubricant supply passage means therethrough for delivering lubricant under pressure to the lubricant annulus. The latter provides for large-area lubricant distribution on one or both sides of the gate, which is an important feature. The provision of the solid core within the lubricant annulus is important because it registers with the flow passage, and the annular seats for the gate, in the closed position of the gate, to provide added strength, while still providing for large-area lubricant discharge between one or both sides of the gate and one or both annular seats. The lubricant, it will be understood, enhances the seal or seals between the gate and its seats.

The invention may be even further summarized as comprising, and yet another important object is to provide an actuating means which comprises: a threaded actuating stem extending longitudinally from one end of the gate in the direction of movement of the gate between its open and closed positions; an annular head on the inner end of the stem having radially outwardly convergent annular surfaces which face longitudinally away from each other; a socket in the gate receiving the annular head on the stem and having radially outwardly convergent annular surfaces which face toward each other and which are complementary to the annular surfaces on the annular head; annular seals between the annular surfaces on the annular head and the annular surfaces of the socket in the gate; an actuating nut threaded on the stem; and lubricant passage means extending through the stem to the lubricant annulus in the gate, the stem containing at least one check valve means preventing reverse flow of lubricant out of the lubricant annulus in the gate.

The foregoing objects, advantages, features and results of the present invention, together with various other objects, advantages, features and results which will be evident to those skilled in the gate valve art in the light of this disclosure, may be achieved with the exemplary embodiment of the invention illustrated in the accompanying drawings and described in detail hereinafter.

DESCRIPTION OF DRAWINGS

FIG. 5 is a sectional view taken as indicated by the arrowed line 5—5 of FIG. 2; and FIG. 6 is a sectional view taken as indicated by the arrowed line 6—6 of FIG. 5.

DETAILED DESCRIPTION OF EXEMPLARY EMBODIMENT OF INVENTION

Figure 1:
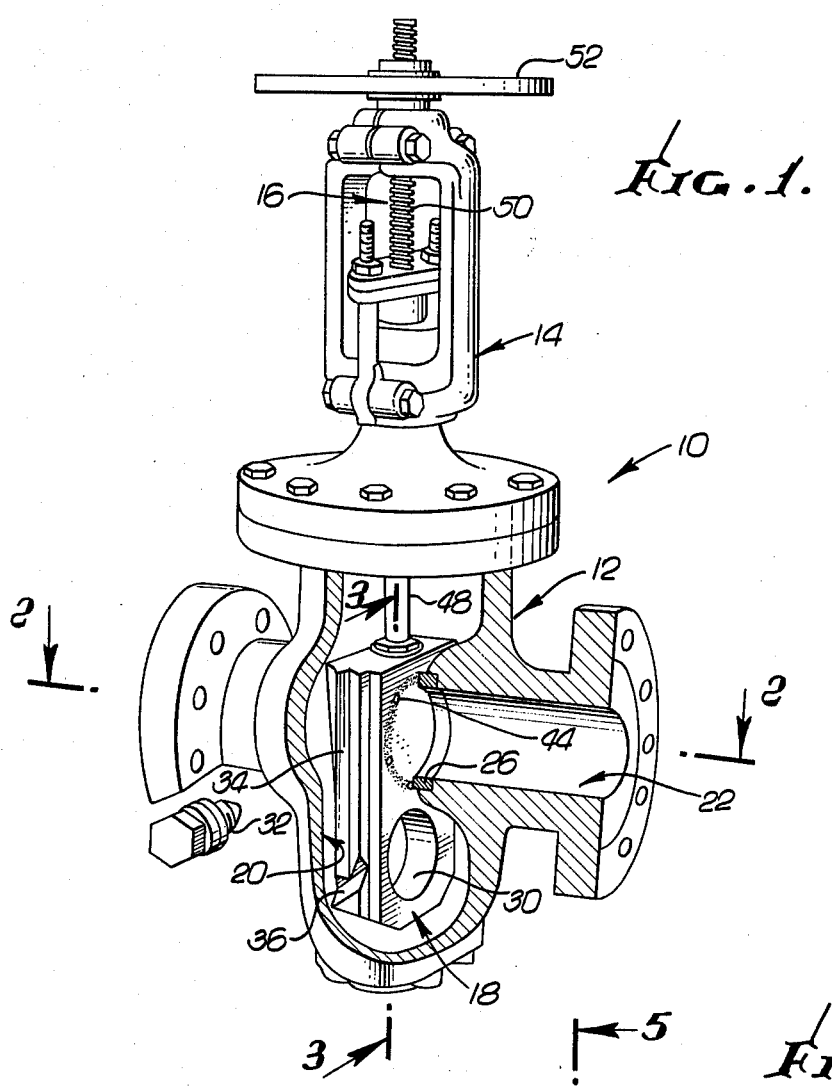
FIG. 1 is a perspective view, partially in elevation and partially in section, showing a wedge-type gate valve of the invention.
Figure 2:
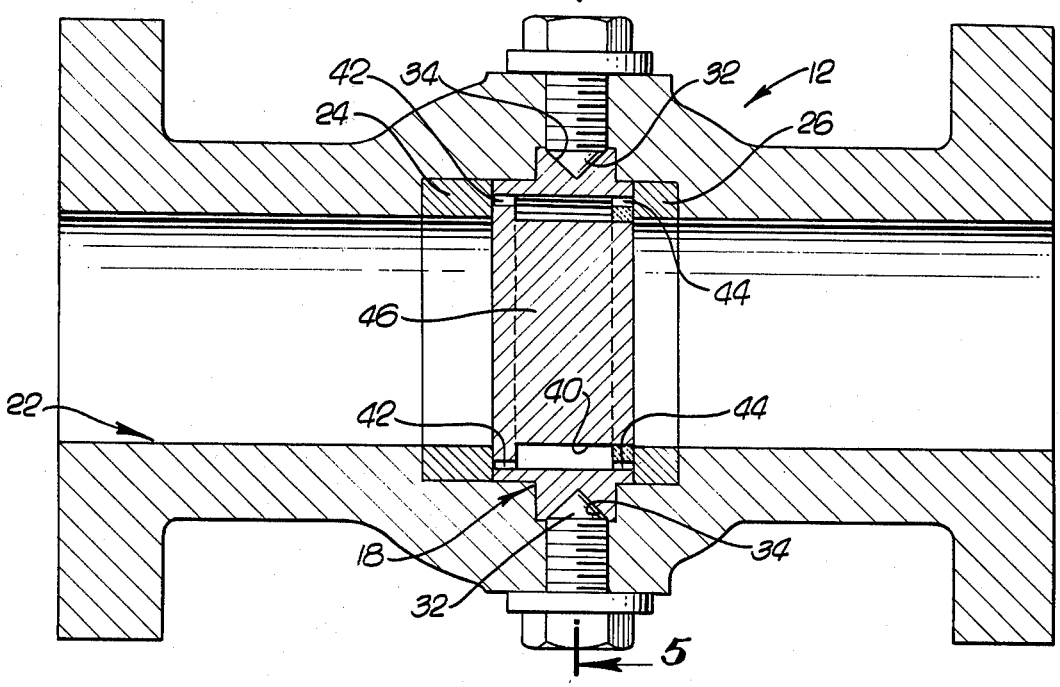
FIG. 2 is an enlarged sectional view taken as indicated by the arrowed lines 2—2 of FIG. 1.
Figure 3:
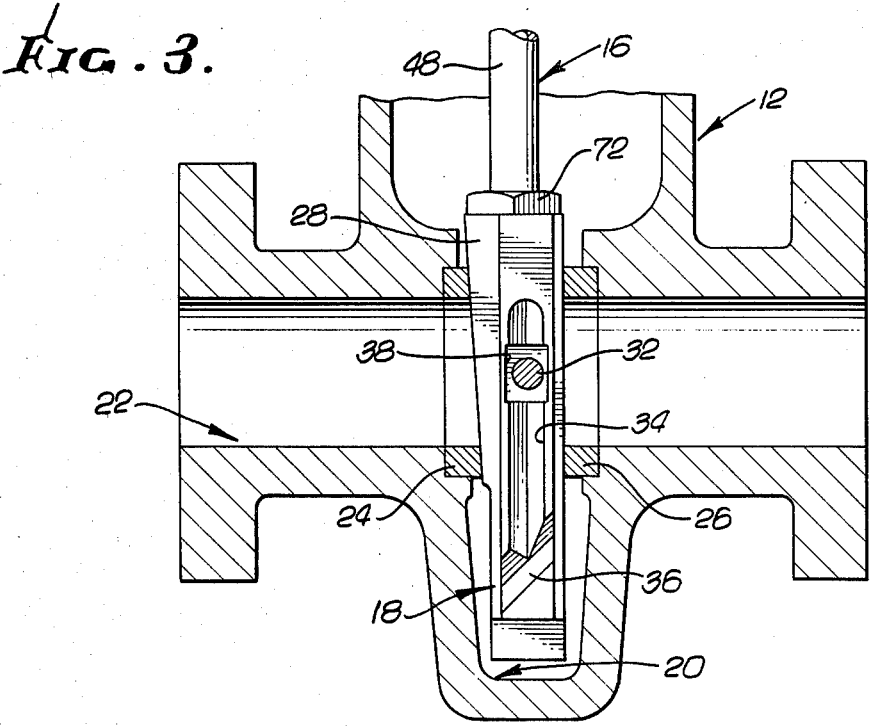
FIG. 3 is an enlarged sectional view, on a smaller scale than FIG. 2, taken as indicated by the arrowed line 3—3 of FIG. 1, and showing the wedge-type gate of the valve in its closed position.
Figure 4:
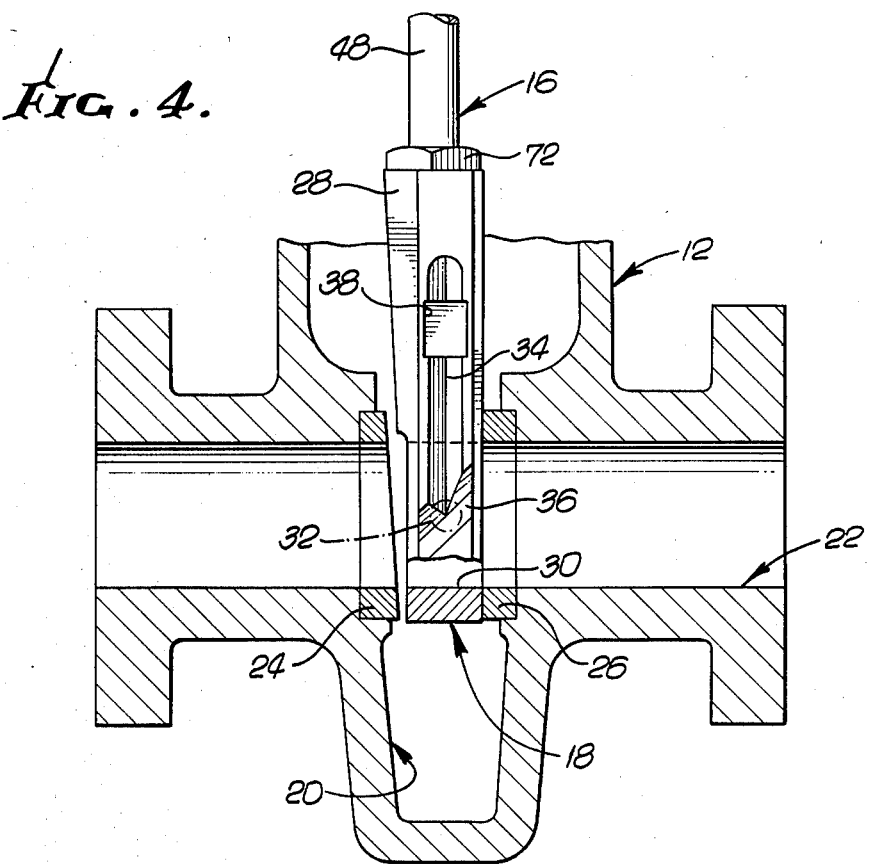
FIG. 4 is a view similar to FIG. 3 but showing the gate in its open position.

The wedge-type gate valve of the invention is designated generally by the numeral 10 in FIG. 1 of the drawings and includes a valve body 12 having mounted thereon a structure 14 carrying an actuating means 16 for displacing a wedge-type gate 18 longitudinally of itself between a closed position, FIGS. 1, 2, 3 and 5, and an open position, FIG. 4.

The valve body 12 is provided therein with a valve chamber 20 for the gate 18, and is provided therethrough with a flow passage 22 intersecting the chamber 20. Carried by the valve body 12 on opposite sides of the chamber 20 are aligned annular seats 24 and 26 encircling the flow passage 22. As best shown in FIG. 3 of the drawings, the gate 18 has a tapered portion 28 which is inserted between the annular seats 24 and 26 in the closed position of the gate, the configurations of the annular seats 24 and 26 providing the chamber 20 with a complementarily tapered portion. In the particular construction illustrated, only one side of the tapered portion 28 of the gate 18 is non-perpendicular to the axis of the flow passage 22, the seating surface of the annular seat 24 being complementarily inclined. The other side of the gate 18, and the seating surface of the other annular seat 26, are perpendicular to the axis of the flow passage 22.

As best shown in FIGS. 1, 4 and 5, the gate 18 is provided with an opening 30 therethrough which registers with the flow passage 22 and the annular seats 24 and 26, as shown in FIG. 4, in the open position of the gate. The opening 30 is preferably a circular port having the same diameter as the inside diameters of the annular seats 24 and 26 and the diameter of the flow passage 22.

A guide means carried by the valve body 12 and engageable with the gate 18 guides the gate between its open and closed positions. This guide means includes two aligned, conical guide pins 32, best shown in FIGS. 2 and 5, which are mounted on the valve body adjacent opposite longitudinal edges of the gate 18, being shown as threaded into the valve body. Opposite longitudinal edges of the gate 18, which is a one-piece structure, are provided with V-shaped, longitudinal guide grooves 34 which are complementary to the conical inner ends of the guide pins 32 and into which the guide pins extend. As will be apparent from FIGS. 2 and 5 in particular, the common axis of the guide pins intersects the longitudinal axis of the flow passage 22. Guiding of the gate 18 between its open and closed positions is carried out entirely by the guide pins 32 in the complementary guide grooves 34, it being unnecessary to have guiding contact between the gate and any portions of the walls defining the chamber 20.

Opposed edges of the gate 18 are provided opposite the port 30 therethrough with inclined cam grooves 36 which intersect the guide gooves 34 and into which the guide pins 32 extend, in the open position of the gate, to cam the gate against the annular seat 26 in the opened position of the gate, as shown in FIG. 4 of the drawings. With this construction, possible abrasion of the gate 18 and the seat 26, due to the presence of abrasives in the fluid flowing through the valve 10, is eliminated since the gate firmly engages the seat 26. As will clear from FIG. 4, in the open position of the gate 18, the gate is spaced a substantial distance from the other annular seat 24 so that there is virtually no possibility of abrasion damage.

As best shown in FIGS. 3 and 4 of the drawings, the guide grooves 34 are provided with slightly widened portions 38 opposite that portion of the gate which is aligned with the annular seats 24 and 26 in the closed position of the gate. (For clarity, the widening of the portions 38 of the guide grooves 34 is exaggerated in FIGS. 3 and 4.) The widened portions 38 of the guide grooves 34 provide slight clearances between the guide pins 32 and the guide grooves 34 in the closed position of the gate 18 so that the gate is free to be seated properly in its closed position by the line pressure in the flow passage 22. As will be apparent, the line pressure causes engagement of the gate 18 with either the annular seat 24, or the annular seat 26, depending on the direction of flow through the passage 22. This self-seating of the gate 18 in its closed position is an important feature of the invention.

As best shown in FIGS. 2, 5 and 6, the gate 18 is provided therein with a lubricant annulus 40 which is aligned with the annular seats 24 and 26 in the closed position of the gate, and which is of substantially the same diameter as the seating surfaces of these seats, the annulus 40 being provided with a lubricant under pressure in a manner to be described hereinafter. The gate 18 is also provided with lubricant ports 42 and 44 which communicate at their inner ends with the lubricant annulus 40 and which lead to the annular portions of the gate 18 which are aligned with the annular seats 24 and 26 in the closed position of the gate. With this construction, large-area lubricant distribution to the matching surfaces of the gate 18 and the annular seats 24 and 26 is provided, which is an important feature. The lubricant, it will be understood, enhances the seals between the gate 18 and its seats 24 and 26.

An important feature is that the lubricant annulus 40 surrounds a solid core 46 which may be integral part of the gate. The diameter of the solid core 46 is substantially equal to the inside diameter of the annular seats 24 and 26 so that it provides the gate 18 with added strength in the closed position of the gate.

The lubricant annulus 40 may be formed around the solid core 46 by milling an annular groove from one side of the gate, then closing the open end of such groove, by brazing, welding, or the like, to form the lubricant annulus, and then drilling the lubricant discharge ports 44 through the added metal. (The lubricant discharge ports 42 may be drilled through the original metal of the gate 18.)

Considering the actuating means 16 for moving the gate 18 longitudinally of itself between its open and closed positions, such actuating means comprises an actuating stem 48 which extends longitudinally from the larger end of the gate and which is connected thereto in a manner to be described hereinafter. The actuating stem 48 extends through the structure 14 and is provided with a threaded portion 50 onto which is threaded a wheel nut 52. As is well known in this art, rotation of the wheel nut 52 in one direction or the other moves the gate 18, through the actuating stem 48, in one direction or the other toward its open or closed positions.

The actuating stem 48 is provided with a longitudinal passage 54 having at its outer end a fitting 56 to which a lubricant pressure source, not shown, may be connected. As shown in FIG. 6, the inner end of the lubricant passage 54 communicates with the lubricant annulus 40 within the gate 18 to supply lubricant under pressure to the annular seats 24 and 26 in the manner hereinbefore described. Check valves 58 and 60 in the lubricant passage 54 prevent reverse flow of the lubricant, which may be a suitable grease.

Turning now to a consideration of the manner in which the actuating stem 48 is connected to the gate 18, the actuating stem as provided at its inner end with an annular head 62 having radially outwardly convergent annular surfaces 64 which face longitidinally of the stem away from each other. A complementary socket 66 in the larger end of the gate 18 receives the annular head 62 on the actuating stem 48 and is provided with radially outwardly convergent annular surfaces 68 which face toward each other and which are complementary to the annular surfaces 64 on the annular head 62. Annular seals 70, which may be O-rings, are disposed in annular grooves in the annular surfaces 64 and are engageable with the annular surfaces 68 of the socket 66. With this construction, a lubricant-tight connection is provided between the actuating stem 48 and the gate 18, while still permitting sufficient floating movement of the gate to permit line pressure to seat it against one or the other of the annular seats 24 and 26, as previously described.

As will be clear from FIG. 6, the annular socket 66 is formed partially within the larger end of the gate 18 and partially within a nut 72 which encircles the inner end of the stem 14 adjacent the annular head 62 and which is threadedly connected to the larger end of the gate. With this construction, the actuating stem 48 and the gate 18 can be assembled readily by slipping the annular nut 72 over the actuating stem, placing the annular head 62 in the socket in the gate, and threadedly connecting the nut 72 to the gate. It will be noted that a key 74 prevents rotation of the stem 48 relative to the gate 18 after assembly, the key 74 being inserted into its keyways in the stem 48 and the nut 72 after assembly. The keyway in the actuating stem is elongated to permit such insertion of the key 74 after assembly.

Although an exemplary embodiment of the invention has been disclosed herein for illustrative purposes, it will be understood that various changes, modifications and substitutions may be incorporated in such embodiment without departing from the inventioned as hereinafter claimed.

I claim as my invention:

1. In a gate valve, the combination of:
  (a) a valve body provided therein with a valve chamber and provided therethrough with a flow passage intersecting said valve chamber;
  (b) a gate movable longitudinally of itself in said valve chamber and transversely of said flow passage between open and closed positions, said gate having an opening therethrough which registers with said flow passage in said open position of said gate;
  (c) said valve body being provided with first and second annular seats for said gate which encircle said flow passage on opposite sides of said gate, with said first seat having a planar face parallel to the direction of movement of said gate and with said second seat having a planar face oblique to the direction of movement of said gate, with said gate having corresponding parallel and oblique seat engaging planar surfaces;
  (d) guide means carried by said valve body and engageable with said gate for guiding said gate between said open and closed positions;
  (e) said guide means including longitudinal V-shaped guide grooves in opposite edges of said gate, and including aligned, conical guide pins carried by said valve body and respectively extending into said guide grooves;
  (f) actuating means carried by said valve body and connected to said gate for moving said gate between said open and closed positions; and
  (g) said guide grooves being provided opposite said opening through said gate with inclined cam grooves into which said guide pins extend in said open position of said gate to cam said gate parallel seat engaging surface against said first seat in said open position of said gate, with said parallel seat engaging surface engaging said first seat and said oblique seat engaging surface engaging said second seat in said closed position of said gate.

2. In a gate valve, the combination of:
  (a) a valve body provided therein with a valve chamber and provided therethrough with a flow passage intersecting said valve chamber;
  (b) a gate movable longitudinally of itself in said valve chamber and transversely of said flow passage between open and closed positions, said gate having an opening therethrough which registers with said flow passage in said open position of said gate;
  (c) said valve body being provided with annular seats for said gate which encircle said flow passage on opposite sides of said gate;
  (d) guide means carried by said valve body and engageable with said gate for guiding said gate between said open and closed positions;
  (e) actuating means carried by said valve body and connected to said gate for moving said gate between said open and closed positions;
  (f) said gate being provided with a solid core and opposed seat engaging surfaces, with said solid core aligned with said annular seats in said closed position of said gate, said solid core being surrounded by a lubricant annulus within said gate, and said gate being provided with lubricant discharge ports on at least one of said seat engaging surfaces and communicating with said lubricant annulus; and
  (g) said actuating means being provided with lubricant passage means therethrough for delivering lubricant under pressure to said lubricant annulus.

3. A gate valve according to claim 2 wherein said lubricant passage means in said actuating means is provided with check valve means therein for preventing reverse flow of lubricant out of said lubricant annulus.

4. In a gate valve, the combination of:
  (a) a valve body provided therein with a valve chamber and provided therethrough with a flow passage intersecting said valve chamber;
  (b) a gate movable longitudinally of itself in said valve chamber and transversely of said flow passage between open and closed positions, said gate having an opening therethrough which registers with said flow passage in said open position of said gate;
  (c) said valve body being provided with annular seats for said gate which encircle said flow passage on opposite sides of said gate;

(d) guide means carried by said valve body and engageable with said gate for guiding said gate between said open and closed positions;

(e) actuating means carried by said valve body and connected to said gate for moving said gate between said open and closed positions;

(f) said actuating means comprising a threaded actuating stem extending longitudinally from one end of said gate in the direction of movement of said gate between said open and closed positions;

(g) said stem being provided at its inner end with an annular head having first and second radial outwardly convergent annular surfaces which face longitudinally away from each other;

(h) said gate being provided with a socket receiving said annular head and having third and fourth radially outwardly convergent annular surfaces which face toward each other and which are complementary to said first and second annular surfaces on said annular head, respectively;

(i) annular seals between said first and third annular surfaces and between said second and fourth annular surfaces; and (j) an actuating nut threaded on said actuating stem.

5. In a gate valve, the combination of:

(a) a valve body provided therein with a valve chamber and provided therethrough with a flow passage intersecting said valve chamber;

(b) a gate movable longitudinally of itself in said valve chamber and transversely of said flow passage between open and closed positions, said gate having an opening therethrough which registers with said flow passage in said open position of said gate;

(c) said valve body being provided with annular seats for said gate which encircle said flow passage on opposite sides of said gate;

(d) guide means carried by said valve body and engageable with said gate for guiding said gate between said open and closed positions;

(e) said guide means including longitudinal V-shaped guide grooves in opposite edges of said gate, and including aligned, conical guide pins carried by said valve body and respectively extending into said guide grooves;

(f) actuating means carried by said valve body and connected to said gate for moving said gate between said open and closed positions; and (g) with said guide grooves widened slightly opposite that portion of said gate which is aligned with said seats in said closed position of said gate, to provide slight clearances between said guide pins and the sides of said guide grooves in the closed position of said gate so that said gate is free to be seated properly in its closed position by pressure in said flow passage.

6. In a gate valve, the combination of:

(a) a valve body provided therein with a valve chamber and provided therethrough with a flow passage intersecting said valve chamber;

(b) a gate movable longitudinally of itself in said valve chamber and transversely of said flow passage between open and closed positions, said gate having an opening therethrough which registers with said flow passage in said open position of said gate;

(c) said valve body being provided with annular seats for said gate which encircle said flow passage on opposite sides of said gate;

(d) guide means carried by said valve body and engageable with said gate for guiding said gate between said open and closed positions;

(e) actuating means carried by said valve body and connected to said gate for moving said gate between said open and closed positions;

(f) said actuating means comprising a threaded actuating stem extending longitudinally from one end of said gate in the direction of movement of said gate between said open and closed positions;

(g) said stem being provided at its inner end with an annular head having radial outwardly convergent annular surfaces which face longitudinally away from each other;

(h) said gate being provided with a socket receiving said annular head and having radially outwardly convergent annular surfaces which face toward each other and which are complementary to said annular surfaces on said annular head;

(i) annular seals between said annular surfaces on said annular head and said annular surfaces of said socket in said gate;

(j) an actuating nut threaded on said actuating stem;

(k) with said gate provided with a solid core and opposed seat engaging surfaces, with said solid core aligned with said annular seats in said closed position of said gate, said solid core being surrounded by a lubricant annulus within said gate, and said gate being provided with lubricant discharge ports on at least one of said seat engaging surfaces and communicating with said lubricant annulus; and (l) with said actuating stem provided with lubricant passage means therethrough for delivering lubricant under pressure to said lubricant annulus.

7. A gate valve according to claim 6 wherein said lubricant passage means in said actuating stem is provided with check valve means therein for preventing reverse flow of lubricant out of said lubricant annulus.

* * * * *